United States Patent
Kuang et al.

(10) Patent No.: US 12,498,554 B2
(45) Date of Patent: Dec. 16, 2025

(54) CONFOCAL SCANNING DARK FIELD MICROSCOPY IMAGING METHOD AND DEVICE

(71) Applicant: ZHEJIANG UNIVERSITY, Zhejiang (CN)

(72) Inventors: Cuifang Kuang, Hangzhou (CN); Yuxuan Qiu, Hangzhou (CN); Yusen Zhang, Hangzhou (CN); Xu Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 270 days.

(21) Appl. No.: 18/512,076

(22) Filed: Nov. 17, 2023

(65) Prior Publication Data

US 2024/0085683 A1    Mar. 14, 2024

Related U.S. Application Data

(63) Continuation of application No. PCT/CN2021/094648, filed on May 19, 2021.

(51) Int. Cl.
*G02B 21/10* (2006.01)
*G02B 21/00* (2006.01)

(52) U.S. Cl.
CPC ......... *G02B 21/10* (2013.01); *G02B 21/0032* (2013.01); *G02B 21/0036* (2013.01); *G02B 21/0092* (2013.01)

(58) Field of Classification Search
CPC ............... G02B 21/10; G02B 21/0032; G02B 21/0036; G02B 21/0092; G02B 21/14;
(Continued)

(56) References Cited

U.S. PATENT DOCUMENTS

2011/0276299 A1    11/2011    Nemoto et al.
2013/0010283 A1    1/2013    Villiger et al.
(Continued)

FOREIGN PATENT DOCUMENTS

CN    101216601 A    7/2008
CN    101285764 A    10/2008
(Continued)

OTHER PUBLICATIONS

International Search Report (PCT/CN2021/094648); Date of Mailing: Jan. 26, 2022.
(Continued)

*Primary Examiner* — Stephone B Allen
*Assistant Examiner* — Adam W Booher
(74) *Attorney, Agent, or Firm* — Wiersch Law Group

(57) ABSTRACT

A confocal scanning dark field microscopy imaging method and device, comprising: modulating a phase of a laser beam emitted by a laser into a 0-2π π vortex phase, where n>3; conjugating the modulated laser beam with an entrance pupil of an objective lens of a confocal scanning microscope, so that a focusing spot of the objective lens is a hollow spot, and an inner ring radius of the hollow spot is greater than a radius of a solid spot without phase modulation; and enabling the confocal scanning microscope to work, thereby achieving dark field microscopy imaging. The present disclosure adopts a confocal design with a pore placed in front of the detector. The plane of the pore is conjugated with the object plane, blocking a defocusing signal from entering the detector.

8 Claims, 3 Drawing Sheets

(58) Field of Classification Search
CPC ...... G02B 21/00; G02B 21/125; G02B 21/06; G02B 21/08; G02B 21/0024; G02B 21/0068; G02B 21/0076; G01N 21/64; G01N 2201/06; G01N 2201/067; G01N 2201/0675
See application file for complete search history.

(56) References Cited

U.S. PATENT DOCUMENTS

2015/0211986 A1　　7/2015　Kuang et al.
2019/0041316 A1*　2/2019　Tanabe ................... G01N 21/01

FOREIGN PATENT DOCUMENTS

| CN | 102289062 | A | | 12/2011 | |
| --- | --- | --- | --- | --- | --- |
| CN | 102798735 | A | | 11/2012 | |
| CN | 102830102 | A | | 12/2012 | |
| CN | 104932108 | A | | 9/2015 | |
| CN | 111220625 | A | | 6/2020 | |
| CN | 111239997 | A | * | 6/2020 | ........... G02B 21/361 |
| CN | 111504970 | A | | 8/2020 | |
| CN | 112130309 | A | | 12/2020 | |
| CN | 112649405 | A | | 4/2021 | |

OTHER PUBLICATIONS

Notice Of Allowance(CN202110547197.0); Date of Mailing: Apr. 8, 2022.
First Office Action(CN202110547197.0); Date of Mailing: Dec. 21, 2021.
Diffraction-Characteristics-of-Vortex-Beams-by-a-Fork-Shaped Grating.
Progress-of-point-wise-scanning-superresolution-methods.

* cited by examiner

CONFOCAL SCANNING DARK FIELD MICROSCOPY IMAGING METHOD AND DEVICE

CROSS-REFERENCE TO RELATED APPLICATIONS

The present application is a continuation of International Application No. PCT/CN2021/094648, filed on May 19, 2021, the content of which is incorporated herein by reference in its entirety.

TECHNICAL FIELD

The present disclosure relates to the field of optical microscopy imaging, and in particular, to a confocal scanning dark field microscopy imaging method and device.

BACKGROUND

Dark field microscope is a microscopic technique based on the optical Tyndall effect. The illuminating light forms a hollow annular light cone by passing through a spotlight lens equipped with an annular aperture. Since the numerical aperture of the objective lens is smaller than that of the spotlight lens, the transmitted light of the sample cannot pass through the objective lens, and only small angle scattered light is collected by the objective lens. This results in an image of bright objects in a dark field, thereby enhancing imaging contrast. In the field of life sciences, the dark field microscope is used to observe unstained transparent samples. In the fields of chemistry and materials science, a spectrometer is employed to analyze the scattered light collected by the dark field microscope to study the scattering spectrum of materials.

SUMMARY

The present disclosure provides a confocal scanning dark field microscopy imaging method and device. Compared with traditional wide field dark field microscopes, the confocal design of the present disclosure has the characteristics of low background noise and excellent tomography ability.

The object of the present disclosure is achieved through the following technical solutions:

In one aspect, the present disclosure provides a confocal scanning dark field microscopy imaging method. The method includes the following steps of:

modulating, by a modulator, a phase of a laser beam emitted by a laser into a 0-2n π vortex phase, where n>3;

conjugating the modulated laser beam with an entrance pupil of an objective lens of a confocal scanning microscope so that a focusing spot of the objective lens is a hollow spot, and an inner ring radius of the hollow spot is greater than a radius of a solid spot without phase modulation; and enabling the confocal scanning microscope to work, thereby achieving dark field microscopy imaging.

A working process of the confocal scanning microscope includes: controlling a scanning mechanism to scan a surface of a sample with the hollow spot; and focusing a reflected light of the sample on a pore conjugated with an object through a lens, and receiving the reflected light by a detector to obtain light intensity distribution under dark field illumination. A point spread function $PSF_c(x,y)$ of the confocal scanning microscope is equal to a convolution of a product of a point spread function $PSF_e(x,y)$ of an illumination system including the laser and the modulator and a point spread function $PSF_f(x,y)$ of an imaging system including the scanning mechanism, a tube lens, and the objective lens, and a pore aperture stop function p (x,y), calculated as follows:

$$PSF_c(x,y)=[PSF_e(x,y)*PSF_f(x,y)]\otimes p(x,y)$$

For the illumination system of a vortex beam illumination, the point spread function of the illumination system is the hollow spot, and the higher an order of vortex light is, the larger the inner ring radius of the hollow spot is; the point spread function of the imaging system is the solid spot, determined by an aperture stop of the objective lens; and for the vortex beam illumination above 3 orders, the inner ring radius of the hollow spot is greater than the radius of the solid spot, and the two spots are staggered with each other, achieving an illumination condition of a dark field.

Further, the step of modulating a phase is specifically as follows:

after the laser beam emitted by the laser is collimated, the collimated laser beam is converted into a P-component linear polarized light by using a polarizer, to be incident on a liquid crystal spatial light modulator; when an applied electric field exceeds a threshold, a liquid crystal molecule exhibit an electrically controlled birefringence effect, therefore, the liquid crystal spatial light modulator only modulates a linear polarized light in one direction;

an exit plane of the liquid crystal spatial light modulator is adjusted to conjugate with the entrance pupil of the objective lens of the confocal scanning microscope; and the 0-2n π vortex phase is loaded on the liquid crystal spatial light modulator.

Further, a half wave plate is arranged behind the polarizer, and the laser beam is converted into the P-component linear polarized light by the half wave plate after passing through the polarizer, so that the liquid crystal spatial light modulator performs pure phase modulation on the P-component linear polarized light;

an optical path is bended by using one D-shaped mirror before the P-component linear polarized light is incident on the liquid crystal spatial light modulator, to reduce an incident angle and improve a performance of the liquid crystal spatial light modulator.

Further, the liquid crystal spatial light modulator corrects an aberration using a Zernike polynomial, thereby improving a quality of the hollow spot.

Further, a quarter wave plate is arranged in front of the objective lens, and the laser beam is converted into a circularly polarized light through the quarter wave plate and incident on the objective lens, thereby improving a quality of the hollow spot for scanning the sample.

The present disclosure provides, in another aspect, a confocal scanning dark field microscopy imaging device. The device includes a laser, a modulator, a 4f system, and a scanning imaging module; and the scanning imaging module includes a scanning mechanism, a tube lens, an objective lens, a lens, a pore, and a detector.

The modulator modulates a phase of a laser beam emitted by the laser into a 0-2n π vortex phase, where n>3.

The 4f system adjusts an exit plane of the modulator to conjugate with an entrance pupil of the objective lens, so that a focusing spot of the objective lens is a hollow spot, and an inner ring radius of the hollow spot is greater than a radius of a solid spot without phase modulation.

The scanning mechanism is allowed to scan a surface of a sample with the hollow spot, a reflected light of the sample is focused on a pore conjugated with an object through a lens, and the reflected light is received by a detector to obtain light intensity distribution under dark field illumination.

A point spread function $PSF_c(x,y)$ of the confocal scanning dark field microscopy imaging device is equal to a convolution of a product of a point spread function $PSF_e(x,y)$ of an illumination system including the laser, the modulator and the 4f system and a point spread function $PSF_f(x,y)$ of an imaging system including the scanning mechanism, the tube lens, and the objective lens, and a pore aperture stop function p (x,y), calculated as follows:

$$PSF_c(x,y)=[PSF_e(x,y)*PSF_f(x,y)] \otimes p(x,y)$$

For a vortex beam illumination above 3 orders, the inner ring radius of the hollow spot is greater than the radius of the solid spot, and the two spots are staggered with each other, achieving an illumination condition of a dark field.

Further, the modulator includes a polarizer and a liquid crystal spatial light modulator.

The laser beam emitted by the laser is collimated and converted into a P-component linear polarized light by using the polarizer to be incident on the liquid crystal spatial light modulator.

The 4f system adjusts the exit plane of the liquid crystal spatial light modulator to conjugate with the entrance pupil of the objective lens, and the 0-2n π vortex phase is loaded on the liquid crystal spatial light modulator.

Further, the 4f system includes a lens 1 and a lens 2, with a front focal plane of the lens 1 coinciding with the exit plane of the modulator, a back focal plane of the lens 1 coinciding with a front focal plane of lens 2, and a back focal plane of lens 2 conjugating with the entrance pupil of the objective lens.

Further, the scanning mechanism is a scanning galvanometer, where the back focal plane of the lens 2 coincides with the midpoint of the line connecting the centers of the two galvanometers, and the midpoint is conjugated with the entrance pupil of the objective lens.

Further, a half wave plate and a polarizing beam splitting prism are arranged in front of the scanning mechanism, the laser beam is converted into a P-light through the half wave plate, and the P-light serves as an incident light of the scanning mechanism after completely passing through the polarizing beam splitting prism; and a quarter wave plate is arranged in front of the objective lens, the P-light is converted into a circularly polarized light through the quarter wave plate and incident on the objective lens, and the reflected light of the sample is converted into an S-light, and the reflected light is reflected by the polarizing beam splitting prism and focused on the pore.

Further, the pore is used to eliminate defocused stray light and is implemented using a pinhole or a multimode fiber.

Compared with the existing technology, the present disclosure offers the following beneficial technical effects: the present disclosure adopts a confocal design with a pore placed in front of the detector, and the plane of the pore is conjugated with the object plane, blocking a defocusing signal from entering the detector. This design improves the signal-to-noise ratio and resolution of imaging, resulting in good tomography ability for dark field microscopy imaging.

DESCRIPTION OF EMBODIMENTS

In order to make the above objects, features and advantages of the present disclosure more comprehensible, specific embodiments of the present disclosure will be described in detail below with reference to the accompanying drawings.

Many specific details are set forth in the following description to facilitate a full understanding of the present disclosure, but the present disclosure may further be implemented in other manners different from those described herein, and those skilled in the art may perform similar promotion without departing from the scope of the present disclosure, so the present disclosure is not limited by the specific embodiments disclosed below.

Figure 1:
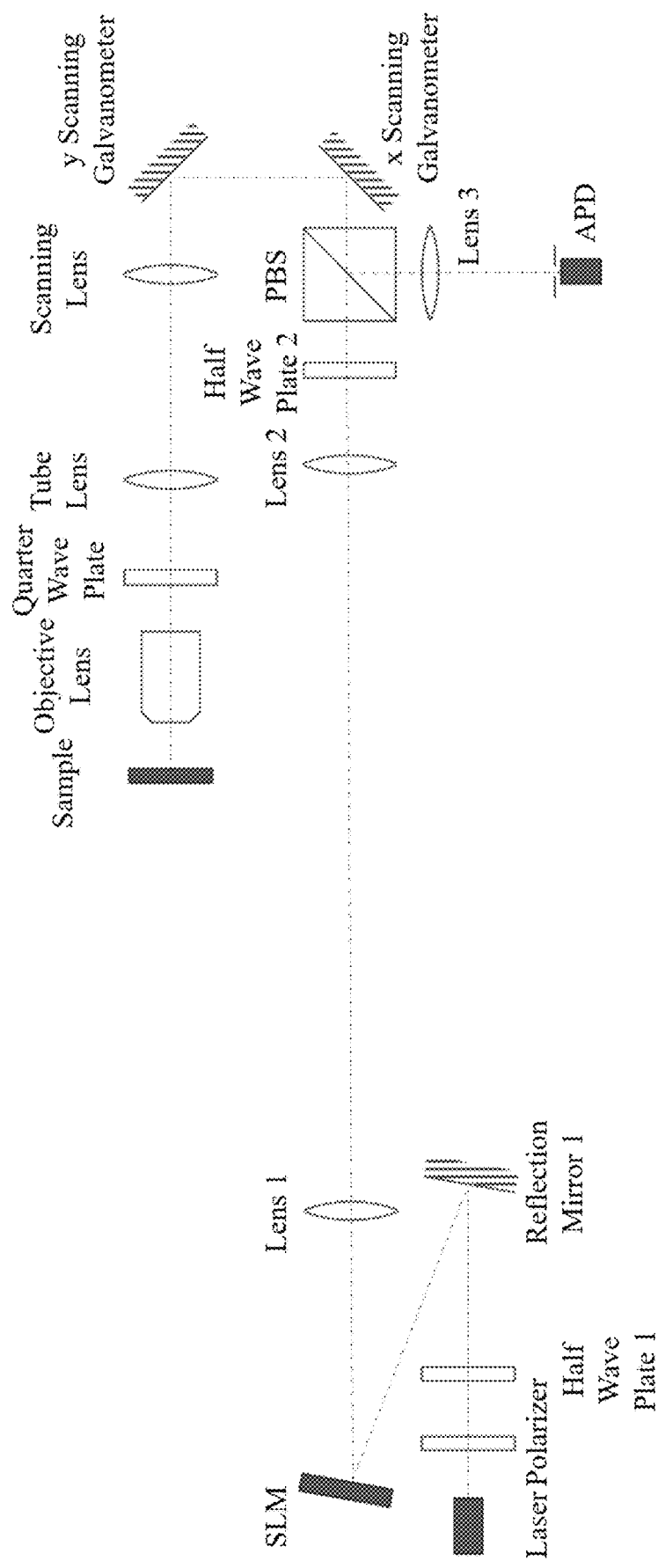
FIG. 1 is a schematic diagram of the implementation of the confocal scanning dark field microscopy imaging method according to the embodiment of the present disclosure.

As shown in FIG. 1, the present disclosure provides a confocal scanning dark field microscopy imaging method. The method includes the following steps:

the phase of a laser beam emitted by a laser is modulated into 0-2n π vortex phase by a modulator, where n>3;

the modulated laser beam is conjugated with the entrance pupil of an objective lens of the confocal scanning microscope, so that the focusing spot of the objective lens is the hollow spot, and the inner ring radius of the hollow spot is greater than the radius of the solid spot without phase modulation;

the confocal scanning microscope is enabled to work, thereby achieving dark field microscopy imaging.

The working process of the confocal scanning microscope is specifically as follows: a scanning mechanism is controlled to scan the surface of the sample with the hollow spot; the scanning mechanism can be a scanning galvanometer or an electrically controlled mobile sample stage; and the reflected light of the sample is focused on the pore conjugated with the object through a lens, and the reflected light is received by a detector to obtain light intensity distribution under dark field illumination.

The point spread function $PSF_c(x,y)$ of the confocal scanning microscope is equal to the convolution of the product of the point spread function $PSF_e(x,y)$ of an illumination system including the laser and the modulator and the point spread function $PSF_f(x,y)$ of an imaging system including the scanning mechanism, a tube lens, and the objective lens, and the pore aperture stop function p (x,y), calculated as follows:

$$PSF_c(x,y)=[PSF_e(x,y)*PSF_f(x,y)] \otimes p(x,y)$$

For the illumination system of the vortex beam illumination, the point spread function of the illumination system is the hollow spot, and the higher the order of vortex light is, the larger the inner ring radius of the hollow spot is; the point spread function of the imaging system is the solid spot, determined by the aperture stop of the objective lens; and for the vortex beam illumination above 3 orders, the inner ring radius of the hollow spot is greater than the radius of the solid spot, and the two spots are staggered with each other, achieving the illumination condition of the dark field.

Further, the step of modulating a phase is specifically as follows:

after the laser beam emitted by the laser is collimated, the collimated laser beam is converted into a P-component linear polarized light by using a polarizer, to be incident on a liquid crystal spatial light modulator; when the applied electric field exceeds a threshold, the liquid crystal molecule exhibit an electrically controlled birefringence effect, therefore, the liquid crystal spatial light modulator only modulates the linear polarized light in one direction;

the exit plane of the liquid crystal spatial light modulator is adjusted to conjugate with the entrance pupil of the objective lens of the confocal scanning microscope; and the 0-2n π vortex phase is loaded on the liquid crystal spatial light modulator.

Further, a half wave plate is arranged behind the polarizer, and the laser beam is converted into a P-component linear polarized light by the half wave plate after passing through the polarizer, so that the liquid crystal spatial light modulator performs pure phase modulation on the P-component linear polarized light.

The optical path is bended by using one D-shaped mirror before the P-component linear polarized light is incident on the liquid crystal spatial light modulator, to reduce the incident angle and improve the performance of the liquid crystal spatial light modulator.

Further, the liquid crystal spatial light modulator corrects the aberration using a Zernike polynomial, thereby improving the quality of the hollow spot.

Further, a quarter wave plate is arranged in front of the objective lens, and the laser beam is converted into a circularly polarized light through the quarter wave plate and incident on the objective lens, thereby improving the quality of the hollow spot for scanning the sample.

To achieve the above method, the confocal scanning dark field microscopy imaging device provided by the present disclosure includes: a laser, a modulator, a 4f system, and a scanning imaging module; and the scanning imaging module includes a scanning mechanism, a tube lens, an objective lens, a lens, a pore, and a detector.

The modulator modulates the phase of the laser beam emitted by the laser into a 0-2n π vortex phase, where n>3.

The 4f system adjusts the exit plane of the modulator to conjugate with the entrance pupil of the objective lens, so that the focusing spot of the objective lens is the hollow spot, and the inner ring radius of the hollow spot is greater than the radius of the solid spot without phase modulation.

The scanning mechanism is enabled scan the surface of the sample with the hollow spot, the reflected light of the sample is focused on the pore conjugated with the object through the lens, and the reflected light is received by the detector to obtain light intensity distribution under dark field illumination.

The point spread function $PSF_c(x,y)$ of the confocal scanning dark field microscopy imaging device is equal to the convolution of the product of the point spread function $PSF_e(x,y)$ of the illumination system including the laser, the modulator and the 4f system and the point spread function $PSF_f(x,y)$ of the imaging system including the scanning mechanism, the tube lens, and the objective lens, and the pore aperture stop function p (x,y), calculated as follows:

$$PSF_c(x,y)=[PSF_e(x,y)*PSF_f(x,y)]\otimes p(x,y)$$

For the vortex beam illumination above 3 orders, the inner ring radius of the hollow spot is greater than the radius of the solid spot, and the two spots are staggered with each other, achieving the illumination condition of the dark field.

Further, the modulator includes the polarizer and the liquid crystal spatial light modulator.

The laser beam emitted by the laser is collimated and converted into the P-component linear polarized light by using the polarizer to be incident on the liquid crystal spatial light modulator.

The 4f system adjusts the exit plane of the liquid crystal spatial light modulator to conjugate with the entrance pupil of the objective lens, and the 0-2n π vortex phase is loaded on the liquid crystal spatial light modulator.

Further, the 4f system includes a lens 1 and a lens 2, with the front focal plane of the lens 1 coinciding with the exit plane of the modulator, the back focal plane of the lens 1 coinciding with the front focal plane of lens 2, and the back focal plane of lens 2 conjugating with the entrance pupil of the objective lens.

Further, the scanning mechanism is the scanning galvanometer, where the back focal plane of the lens 2 coincides with the midpoint of the line connecting the centers of the two galvanometers, and the midpoint is conjugated with the entrance pupil of the objective lens.

Further, a half wave plate and a polarizing beam splitting prism are arranged in front of the scanning mechanism, the laser beam is converted into a P-light through the half wave plate, and the P-light serves as the incident light of the scanning mechanism after completely passing through the polarizing beam splitting prism; and a quarter wave plate is arranged in front of the objective lens, the P-light is converted into the circularly polarized light through the quarter wave plate and incident on the objective lens, and the reflected light of the sample is converted into an S-light, and the reflected light is reflected by the polarizing beam splitting prism and focused on the pore.

Figure 2:
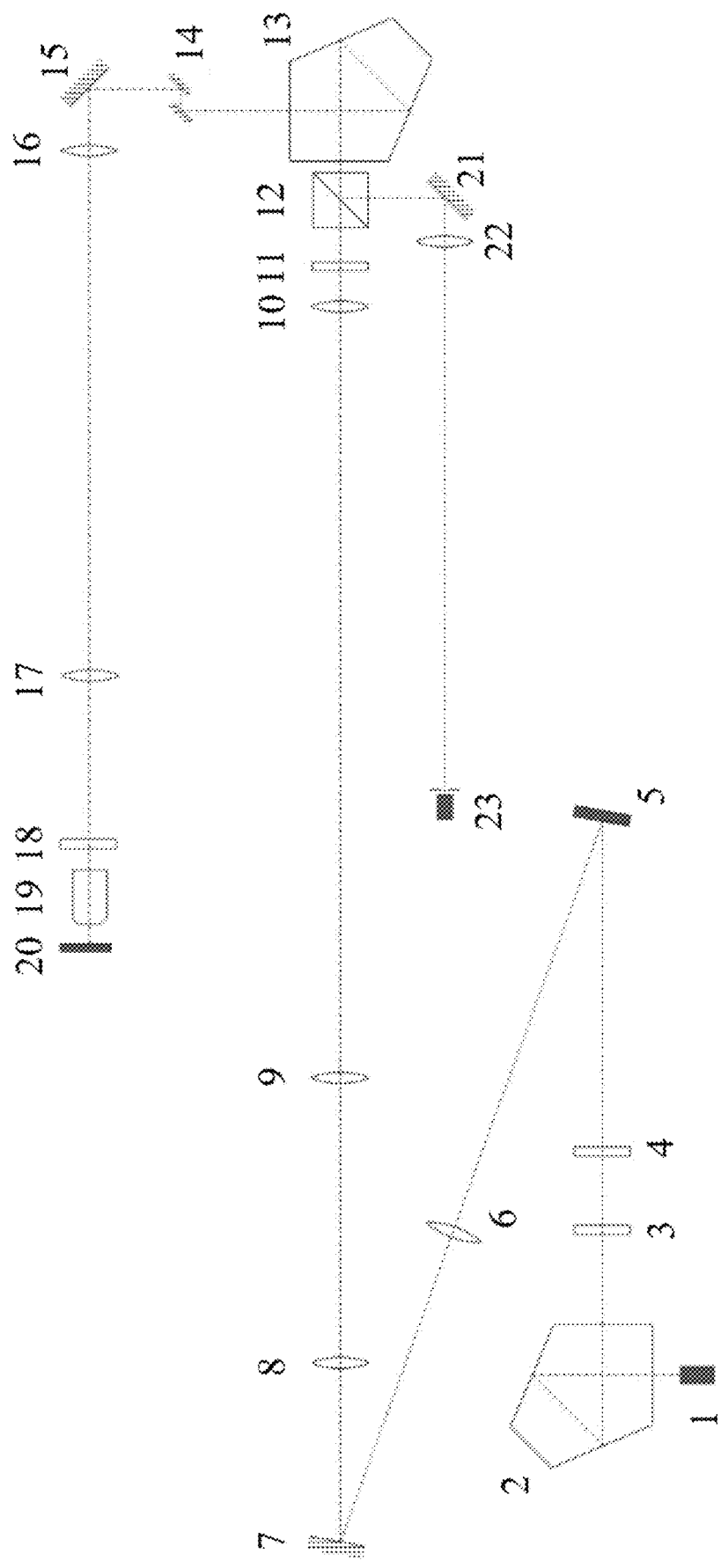
FIG. 2 is a schematic diagram of the confocal scanning dark field microscopy imaging device according to the embodiment of the present disclosure.
Figure 3:
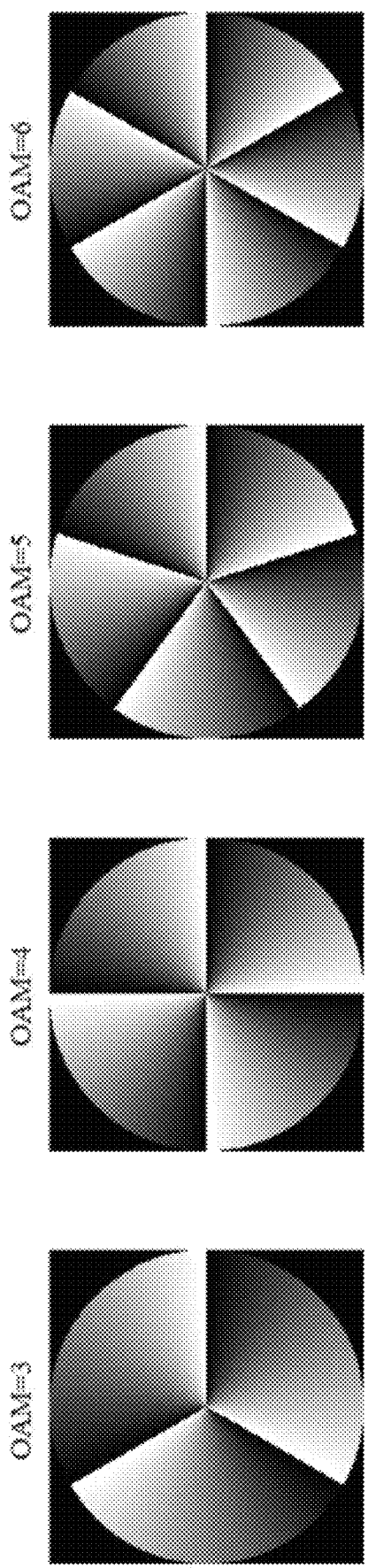
FIG. 3 is a schematic diagram of the phase mask for generating a high-order vortex beam.

The following provides a specific implementation example of the present disclosure, but is not limited thereto. The structure of the confocal scanning dark field microscopy imaging device in this example is shown in FIG. 2, including a laser generation and collimation device 1, a first D-shaped mirror 2, a polarizer 3, a first half wave plate 4, a liquid crystal spatial light modulator 5, a first lens 6, a first reflection mirror 7, a second lens 8, a third lens 9, a fourth lens 10, a second half wave plate 11, a polarizing beam splitting prism 12, a second D-shaped mirror 13, a scanning galvanometer module 14, a second reflection mirror 15, a scanning lens 16, a tube lens 17, a quarter wave plate 18, an objective lens 19, a sample stage 20, a third reflection mirror 21, a fifth lens 22, and an avalanche diode 23. The phase mask for generating the high-order vortex beam is shown in FIG. 3.

When the device is in operation, the beam generated by the laser generation and collimation device 1, after passing through the first D-shaped mirror 2, becomes the linear polarized light after passing through the polarizer 3. After passing through the first half wave plate 4, the linear polarized light becomes the P-light and arrives at the liquid crystal spatial light modulator 5 to modulate the linear polarized light into high-order vortex light. The exit light of the liquid crystal spatial light modulator 5 sequentially passes through the 4f system including the first lens 6 and the second lens 8, and the 4f system including the third lens 9 and the fourth lens 10. After passing through the second half wave plate 11, the P-light passes through the polarizing beam splitting prism 12, and enters the scanning galvanometer module 14 through the second D-shaped mirror 13, where the midpoint of the line connecting the centers of two galvanometers is conjugated with the exit plane of the spatial light modulator. The light is converted to circularly polarized light by the quarter wave plate 18 after passing through the second reflection mirror 15, the scanning lens 16, and the tube lens 17, and scans the surface of the sample after passing through the objective lens 19. The reflected light, after passing through the objective lens 19, is converted to S-light by the quarter wave plate 18. The reflected light sequentially passes through the tube lens 17, the scanning lens 16, the second reflection mirror 15, the scanning galvanometer module 14, and the second D-shaped mirror 13, and is reflected at the polarizing beam splitting prism 12. The reflected light is then focused at the pore through the third reflection mirror 21 and the fifth lens 22, and optical signals are collected at the avalanche diode 23 behind the pore.

The above description is only a preferred embodiment of the present disclosure, and although the present disclosure has been disclosed above by preferred embodiments, it is not intended to limit the present disclosure. Those skilled in the art can make many possible changes and modifications to the technical solutions of the present disclosure or modify the technical solutions into equivalent embodiments of equivalent changes by using the methods and technical contents disclosed above without departing from the scope of the technical solutions of the present disclosure. Therefore, any simple modification, equivalent change and modification made to the above embodiments according to the technical essence of the present disclosure without departing from the content of the technical solution of the present disclosure still fall within the protection scope of the technical solution of the present disclosure.

What is claimed is:

1. A confocal scanning dark field microscopy imaging method, comprising:
    modulating, by a modulator, a phase of a laser beam emitted by a laser into a 0-2nπ vortex phase, where n>3;
    conjugating a modulated laser beam with an entrance pupil of an objective lens of a confocal scanning microscope, in such a manner that a focusing spot of the objective lens is a hollow spot, and an inner ring radius of the hollow spot is greater than a radius of a solid spot without phase modulation; and
    enabling the confocal scanning microscope to work, thereby achieving dark field microscopy imaging;
    wherein a working process of the confocal scanning microscope comprises: controlling a scanning mechanism to scan a surface of a sample with the hollow spot; and focusing a reflected light of the sample on a pore conjugated with an object through a lens, and receiving the reflected light by a detector to obtain light intensity distribution under dark field illumination;
    wherein a point spread function $PSF_c(x,y)$ of the confocal scanning microscope is equal to a convolution of a product of a point spread function $PSF_e(x,y)$ of an illumination system, comprising the laser and the modulator, and a point spread function $PSF_f(x,y)$ of an imaging system, comprising the scanning mechanism, a tube lens, and the objective lens, and a pore aperture stop function p (x,y), calculated as follows:

$$PSF_c(x,y)=[PSF_e(x,y)*PSF_f(x,y)]\otimes p(x,y)$$

and wherein for the illumination system of a vortex beam illumination, the point spread function of the illumination system is the hollow spot, and the higher an order of vortex light is, the larger the inner ring radius of the hollow spot is; the point spread function of the imaging system is the solid spot, determined by an aperture stop of the objective lens; and for the vortex beam illumination above 3 orders, the inner ring radius of the hollow spot is greater than the radius of the solid spot, and the hollow spot and the solid spot are staggered with each other, in such a manner to achieve an illumination condition of a dark field.

2. The confocal scanning dark field microscopy imaging method according to claim 1, wherein the step of modulating a phase comprises:
    after the laser beam emitted by the laser is collimated, converting the laser beam into a P-component linear polarized light by using a polarizer to be incident on a liquid crystal spatial light modulator; and
    adjusting an exit plane of the liquid crystal spatial light modulator to conjugate with the entrance pupil of the objective lens of the confocal scanning microscope; and
    loading the 0-2nπ vortex phase on the liquid crystal spatial light modulator.

3. The confocal scanning dark field microscopy imaging method according to claim 2, wherein a half wave plate is arranged behind the polarizer, and the laser beam is converted into the P-component linear polarized light by the half wave plate after passing through the polarizer, in such a manner that the liquid crystal spatial light modulator performs pure phase modulation on the P-component linear polarized light; and
    wherein an optical path is bended by using one D-shaped mirror before the P-component linear polarized light is incident on the liquid crystal spatial light modulator, to reduce an incident angle and improve a performance of the liquid crystal spatial light modulator.

4. The confocal scanning dark field microscopy imaging method according to claim 2, wherein the liquid crystal spatial light modulator corrects an aberration using a Zernike polynomial, thereby improving a quality of the hollow spot.

5. The confocal scanning dark field microscopy imaging method according to claim 1, wherein a quarter wave plate is arranged in front of the objective lens, and the laser beam is converted into a circularly polarized light by the quarter wave plate and incident on the objective lens, thereby improving a quality of the hollow spot for scanning the sample.

6. A confocal scanning dark field microscopy imaging device, wherein the device comprises a laser, a modulator, a 4f system, and a scanning imaging module; and the scanning imaging module comprises a scanning mechanism, a tube lens, an objective lens, a lens, a pore, and a detector; wherein the modulator modulates a phase of a laser beam emitted by the laser into a 0-2nπ vortex phase, where n>3;
    the 4f system adjusts an exit plane of the modulator to conjugate with an entrance pupil of the objective lens, in such a manner that a focusing spot of the objective lens is a hollow spot, and an inner ring radius of the hollow spot is greater than a radius of a solid spot without phase modulation;
    the scanning mechanism is allowed to scan a surface of a sample with the hollow spot, a reflected light of the sample is focused on a pore conjugated with an object through a lens, and the reflected light is received by the detector to obtain light intensity distribution under dark field illumination; and
    a point spread function $PSF_c(x,y)$ of the confocal scanning dark field microscopy imaging device is equal to a convolution of a product of a point spread function $PSF_e(x,y)$ of an illumination system, comprising the laser, the modulator and the 4f system, and a point spread function $PSF_f(x,y)$ of an imaging system, comprising the scanning mechanism, the tube lens, and the objective lens, and a pore aperture stop function p (x,y), calculated as follows:

$$PSF_c(x,y)=[PSF_e(x,y)*PSF_i(x,y)]\otimes p(x,y)$$

for a vortex beam illumination above 3 orders, the inner ring radius of the hollow spot is greater than the radius of the solid spot, and the hollow spot and the solid spot are staggered with each other, in such a manner to achieve an illumination condition of a dark field.

7. The confocal scanning dark field microscopy imaging device according to claim 6, wherein the modulator comprises a polarizer and a liquid crystal spatial light modulator;

wherein the laser beam emitted by the laser is collimated and converted into a P-component linear polarized light by using the polarizer to be incident on the liquid crystal spatial light modulator; and wherein the 4f system adjusts the exit plane of the liquid crystal spatial light modulator to conjugate with the entrance pupil of the objective lens, and the 0-2nπ vortex phase is loaded on the liquid crystal spatial light modulator.

8. The confocal scanning dark field microscopy imaging device according to claim 6, wherein a half wave plate and a polarizing beam splitting prism are arranged in front of the scanning mechanism, the laser beam is converted into a P-light through the half wave plate, and the P-light serves as an incident light of the scanning mechanism after completely passing through the polarizing beam splitting prism; and a quarter wave plate is arranged in front of the objective lens, the P-light is converted into a circularly polarized light through the quarter wave plate and incident on the objective lens, and the reflected light of the sample is converted into an S-light, and the reflected light is reflected by the polarizing beam splitting prism and focused on the pore.

* * * * *